(12) United States Patent
Kanao (10) Patent No.: US 9,339,109 B2
(45) Date of Patent: May 17, 2016

(54) LIGHTWEIGHT DECORATIVE PANEL HAVING OPENING AND PRODUCTION METHOD THEREFOR

(71) Applicant: KANAFLEX CORPORATION, Osaka (JP)

(72) Inventor: Shigeki Kanao, Hyogo (JP)

(73) Assignee: Kanaflex Corporation, Osaka (JP)

( * ) Notice: Subject to any disclaimer, the term of this patent is extended or adjusted under 35 U.S.C. 154(b) by 0 days.

(21) Appl. No.: 14/410,883

(22) PCT Filed: Sep. 5, 2013

(86) PCT No.: PCT/JP2013/073957
§ 371 (c)(1),
(2) Date: Dec. 23, 2014

(87) PCT Pub. No.: WO2014/038631
PCT Pub. Date: Mar. 13, 2014

(65) Prior Publication Data
US 2015/0320208 A1    Nov. 12, 2015

(30) Foreign Application Priority Data
Sep. 5, 2012  (JP) .................... 2012-195486

(51) Int. Cl.
| A47B 96/18 | (2006.01) |
| A47B 77/06 | (2006.01) |
| A47B 96/20 | (2006.01) |
| B32B 37/14 | (2006.01) |

(Continued)

(52) U.S. Cl.
CPC .............. *A47B 77/06* (2013.01); *A47B 96/18* (2013.01); *A47B 96/201* (2013.01); *A47B 96/205* (2013.01); *B32B 3/14* (2013.01); *B32B 3/266* (2013.01); *B32B 9/002* (2013.01); *B32B 9/04* (2013.01); *B32B 13/04* (2013.01); *B32B 37/14* (2013.01); *B32B 37/18* (2013.01); *C04B 28/00* (2013.01); *E04C 2/06* (2013.01);

(Continued)

(58) Field of Classification Search
CPC .......... A47B 96/18; A47B 77/06; A47B 1/00; A47B 1/04; B32B 3/266; B32B 9/002; B32B 2305/02
See application file for complete search history.

(56) References Cited

U.S. PATENT DOCUMENTS

2012/0219747 A1    8/2012  Kanao

FOREIGN PATENT DOCUMENTS

| CN | 200963091 | 10/2007 |
| JP | 62-166755 | 10/1987 |

(Continued)

OTHER PUBLICATIONS

Chinese Office Action issued Mar. 10, 2015 in corresponding Chinese Patent Application No. 201380007776.X, with English translation.

(Continued)

*Primary Examiner* — Alexander Thomas
(74) *Attorney, Agent, or Firm* — Wenderoth, Lind & Ponack, L.L.P.

(57) ABSTRACT

Provided are a decorated lightweight decorative panel without losing its strength, and a production method therefor. The lightweight decorative panel 1 according to the present invention has an opening. A first main surface is made of a decorative stone plate 4 as a whole. A peripheral part of a second main surface surrounding the opening is made of a framing stone material 3. A part of the second main surface excluding the framing stone material is made of a porous formed-material 2 in a shape of a plate.

9 Claims, 10 Drawing Sheets

(51) Int. Cl.
*B32B 3/26* (2006.01)
*B32B 3/14* (2006.01)
*B32B 9/00* (2006.01)
*B32B 9/04* (2006.01)
*B32B 13/04* (2006.01)
*B32B 37/18* (2006.01)
*C04B 28/00* (2006.01)
*E04C 2/06* (2006.01)
*E03C 1/33* (2006.01)

(52) U.S. Cl.
CPC ........ *B32B 2250/02* (2013.01); *B32B 2305/02* (2013.01); *B32B 2305/08* (2013.01); *B32B 2307/718* (2013.01); *B32B 2419/00* (2013.01); *B32B 2451/00* (2013.01); *B32B 2607/00* (2013.01); *E03C 1/33* (2013.01); *Y10T 156/10* (2015.01); *Y10T 156/1052* (2015.01); *Y10T 428/24322* (2015.01)

(56) References Cited

FOREIGN PATENT DOCUMENTS

| | | |
|---|---|---|
| JP | 64-10829 | 1/1989 |
| JP | 1-168644 | 11/1989 |
| JP | 3-101931 | 4/1991 |
| JP | 2007-146484 | 6/2007 |
| JP | 2009-235692 | 10/2009 |
| WO | 2011/059033 | 5/2011 |

OTHER PUBLICATIONS

International Search Report issued Nov. 26, 2013 in International (PCT) Application No. PCT/JP2013/073957.

Written Opinion of the International Searching Authority issued Nov. 26, 2013 in International (PCT) Application No. PCT/JP2013/073957.

LIGHTWEIGHT DECORATIVE PANEL HAVING OPENING AND PRODUCTION METHOD THEREFOR

TECHNICAL FIELD

The present invention relates to a lightweight decorative panel which can be used as a top-plate member for a kitchen counter having a sink, and the like, and a method for producing thereof.

BACKGROUND ART

There is a conventional kitchen counter having a sink, which has a structure with an opening, to which a sink is attached, and which is created through a top-plate member having a decoration made of an artificial marble stone or the like, and with a sink for the kitchen, which is made of a stainless steel plate or the like, being attached to the opening for the think (see, for example, Patent Literature 1).

PRIOR ART REFERENCES

Patent Literature

Patent literature 1: JP 2009-235692 A

SUMMARY OF INVENTION

Problem to be Solved by the Invention

A top-plate member having a decoration comprised of an artificial marble stone or the like is very heavy. Therefore, in case of that a kitchen counter having such top-plate member is constructed, it is hard to convey the top-plate member. Therefore, it requires many workers. Herein, it is desirable to convey the kitchen counter into the room after preparing heavy machineries, rollers, etc. However, such preparation of the heavy machineries or the like is time-consuming or complex. Depending on the construction site, it is sometimes not able to carry the heavy machineries or the like into the room. In addition, the workers at the construction site require improved workability. In order to solve these problems, it is desirable that the top-plate member itself is necessarily to be easily handled and light-weighted. Herein, its strength should not be reduced, in spite of the light-weighting, and its appearance should not be deteriorated.

The present invention is one considering and solving the above-described problems in the prior arts. Therefore, the present invention provides a lightweight decorative panel having a decoration, which is light-weighted, without losing its strength as well as a production method thereof.

Means for Solving Problems

The lightweight decorative panel according to the present invention is summarized as follows:
a lightweight decorative panel having an opening, wherein
a first main surface is made of a decorative stone plate as a whole;
a peripheral part of a second main surface surrounding the opening is made of a framing stone material (or stone material in the form of a frame); and
a part of the second main surface excluding the framing stone material is made of a porous formed-material in a shape of a plate.

According to the present invention, it is preferable that the porous formed-material is comprised of a porous lightweight cementitious panel wherein a bubble(s) and a reinforcing fiber(s) are dispersed in a cured-cementitious material.

According to the lightweight decorative panel of the present invention, it is preferable that the porous formed-material is comprised of a laminated panel having a structure comprising at least five layers wherein a first reinforcing layer, a first porous lightweight cementitious panel, a second reinforcing layer, a second porous lightweight cementitious panel, and a third reinforcing layer are disposed in this order.

According to the lightweight decorative panel of the present invention, the panel may have a structure wherein a plurality of the laminated panels are alternately stacked twice or more.

According to the lightweight decorative panel of the present invention, it is preferable that the decorative stone plate is made of a granite (or Mikage) stone or a marble stone.

According to the lightweight decorative panel of the present invention, the lightweight decorative panel can be used in a top-plate member of a kitchen counter having a sink, a wall material having a window, or a wall material having a ventilation opening.

According to the lightweight decorative panel of the present invention, it is preferable that
the framing stone material has a second opening generally at its center;
the porous formed-material has a first opening larger than the second opening;
an outer peripheral edge of the framing stone material is fitted to an inner peripheral edge of the first opening of the porous formed-material, so that the edges are closely related to each other, and the framing stone material and the porous formed-material are conjugated together;
the decorative stone plate has a third opening to communicate with the second opening, and is disposed on the conjugate of the porous formed-material and the framing stone material.

Herein, the first opening, the second opening and the third opening are holes respectively in the perforated state. The second opening and the third opening are in the perforated state, in their thickness directions, in the lightweight decorative panel as a finished product.

The method for producing the lightweight decorative panel of the present invention is summarized as a method for producing a lightweight decorative panel having an opening, which comprises:
a laminating step for disposing a porous formed-material having a first opening larger than the opening and being in a shape of a plate, and a plate-shape stone material having a dimension to be fitted to an inner periphery of the first opening, on one side of a decorative stone plate, to form a laminate; and
after the laminating step, an opening step for providing an opening passing through a part of the plate-shape stone material of the laminate.

According to the method for producing the lightweight decorative panel of the present invention, it is preferable that a set of the single porous formed-material and the single plate-shape stone material is disposed on the both sides of the decorative stone plate, respectively, during the laminating step; and the method comprises a slicing step for cutting the decorative stone plate between the laminating step and the opening step, or after the opening step.

Effect of Invention

According to the lightweight decorative panel of the present invention, the panel can be light-weighted without losing its strength by using of a porous formed-material in a shape of a plate in a part of the structure. Therefore, the lightweight decorative panel can be easily conveyed. Accordingly, the number of the workers conveying the panel can be decreased, and therefore, there is no need to take the heavy machinery or the like into the room. Accordingly, use of the lightweight decorative panel of the present invention can facilitate handling of the panel at the construction site. Therefore, the workability at the construction site can be improved.

Furthermore, according to the lightweight decorative panel of the present invention, the first main surface can be composed of the decorative stone plate as a whole, and the peripheral part of the second main surface surrounding the opening can be comprised of the framing stone material. Therefore, the inner peripheral edge of the opening can be covered with the framing stone material. Accordingly, at the inner peripheral edge, the porous formed-material is not exposed. Therefore, the panel can be light-weighted without deteriorating its appearance.

Herein, it is preferable to use homogeneous or similar materials to each other in the decorative stone plate and the framing stone material so that the boundary between the decorative stone plate and the framing stone material can be unremarkable. Whereas, different materials can be used for the decorative stone plate and the framing stone material in order to improve the design property.

BRIEF DESCRIPTION OF DRAWINGS

Herein, in order to facilitate understanding of the present invention, the first main surface is downwardly illustrated, which is to be used upwardly, and the second main surface is upwardly illustrated, which is to be used downwardly, in these figures and the following FIGS. 2, 3A, 3B, 4A, 4B, 7A, 7B, 9 and 10.

DESCRIPTION OF EMBODIMENTS

Figure 1A:
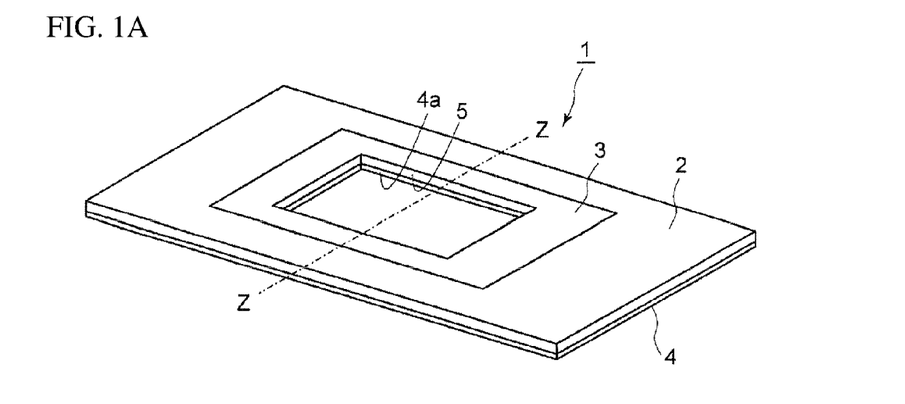
FIG. 1A is a perspective view of the lightweight decorative panel according to the first embodiment of the present invention.
Figure 1B:
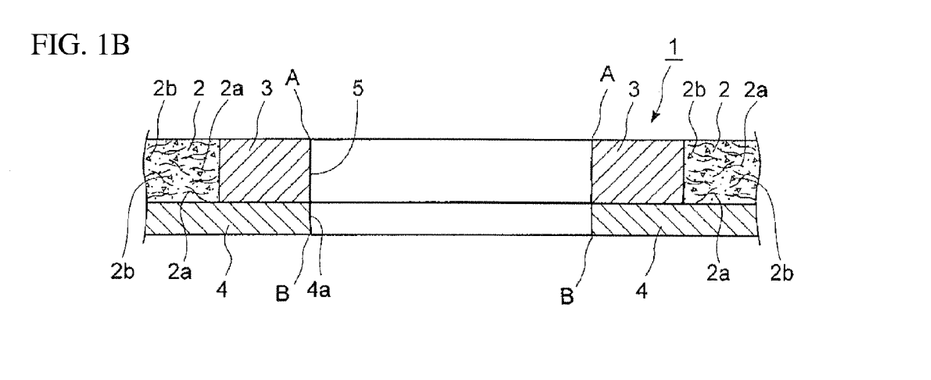
FIG. 1B is a perpendicular cross-sectional view of the lightweight decorative panel illustrated in FIG. 1A at dashed line Z-Z.

Hereinafter, the present invention is described in detail based on the embodiments illustrated in the drawings.
1. First Embodiment
1-1. Structure of Lightweight Decorative Panel As shown in FIGS. 1A and 1B, the lightweight decorative panel 1 has an opening (comprised of the second opening 5 and the third opening 4a), the first main surface is made of a decorative stone plate 4 as a whole, a peripheral part of the second main surface surrounding the opening is made of a framing stone material 3, and a part of the second main surface excluding the framing stone material 3 is made of a porous formed-material 2 in a shape of a plate. Herein, in order to facilitate understanding of the cross-sectional structure of the lightweight decorative panel 1, the decorative stone plate 4 is downwardly illustrated, which is to be used upwardly, in FIGS. 1A and 1B and the following FIGS. 2A, 3A, 3B, 4A, 4B, 7A, 7B, 9 and 10 described below.

Figure 2:
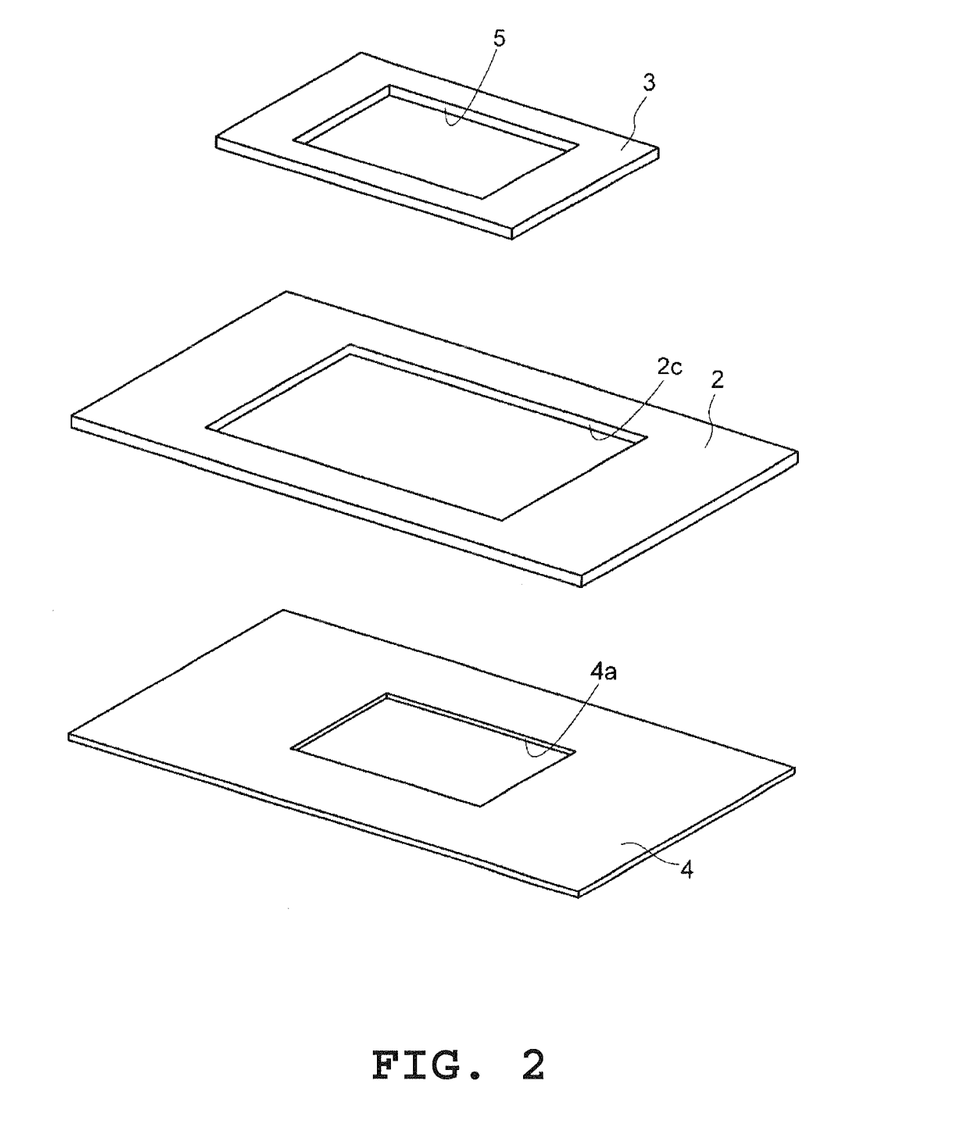
FIG. 2 is an exploded view of the lightweight decorative panel according to the first embodiment of the present invention.
Figure 3A:
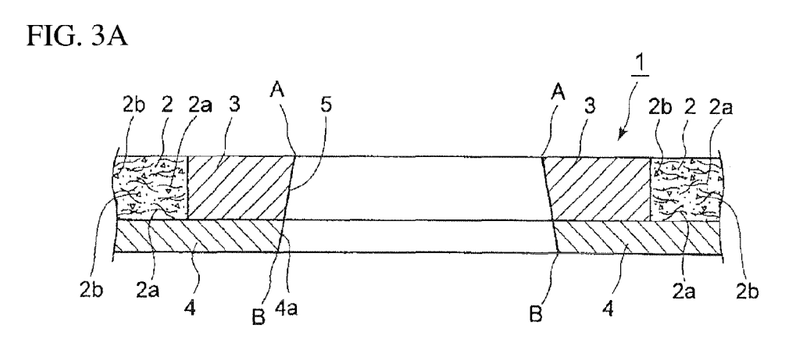
FIGS. 3A and 3B are perpendicular cross-sectional views of the lightweight decorative panel according to a variation of the present invention.
Figure 3B:
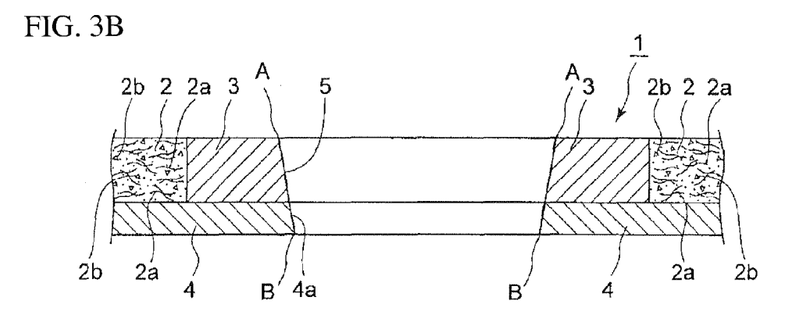

Furthermore, as shown in the exploded view of FIG. 2, the framing stone material 3 has the second opening 5 generally at its center. The porous formed-material 2 has the first opening 2c which is larger than the second opening 5. The decorative stone plate 4 has the third opening 4a communicating to the second opening 5. Herein, the outer peripheral edge of the framing stone material 3 is fitted to the inner peripheral edge of the first opening 2c of the porous formed-material 2, so that these edges are closely related to each other, and the framing stone material 3 and the porous formed-material 2 are conjugated together. The decorative stone plate 4 is disposed on the conjugate of the porous formed-material 2 and the framing stone material 3. Herein, it is preferable that the inner peripheral surface of the opening comprised of the second opening 5 and the third opening 4a is formed not to have any step in the thickness direction and formed as a flush surface. Herein, the inner peripheral surface of the opening may not be perpendicular as shown in FIG. 1B. For example, as shown in FIG. 3A, it may be broad toward the side of the decorative stone plate 4 (which is upper side in use). As shown in FIG. 3B, it may be broad toward the side of the framing stone material 3 (which is lower side in use). It is also preferable that, in the lightweight decorative panel 1c, the boundary part A between the second opening 5 and the first main surface, and the boundary part B between the third opening 4a and the second main surface are formed in round shapes.

As described hereinafter in detail, the second opening 5 and the third opening 4a are formed by a perforation after the lamination. It is not excluded the previous perforations prior to the lamination.

As the framing stone material 3 and the decorative stone plate 4, any stone material can be used respectively. For example, the stone material includes a granite (or Mikage) stone such as a granite, a diorite, a gabbro and a syenite, and a marble stone, etc. The framing stone material 3 and the decorative stone plate 4 can be comprised of the same stone material respectively, or different stone materials, respectively. The porous formed-material 2 is described hereinafter. It is more preferable that the decorative stone plate 4 is a single seamless sheet by the reason of its appearance.

For an example of the designation value, the thickness of the porous formed-material 2 and the thickness of the framing stone material 3 are approximately the same respectively. The thickness is preferably within a range from 15 to 35 mm. The thickness of the decorative stone plate 4 is preferably within a range from 5 to 15 mm. The frame width of the framing stone material 3 is preferably within a range from about 30 to 60 mm.

Figure 4A:
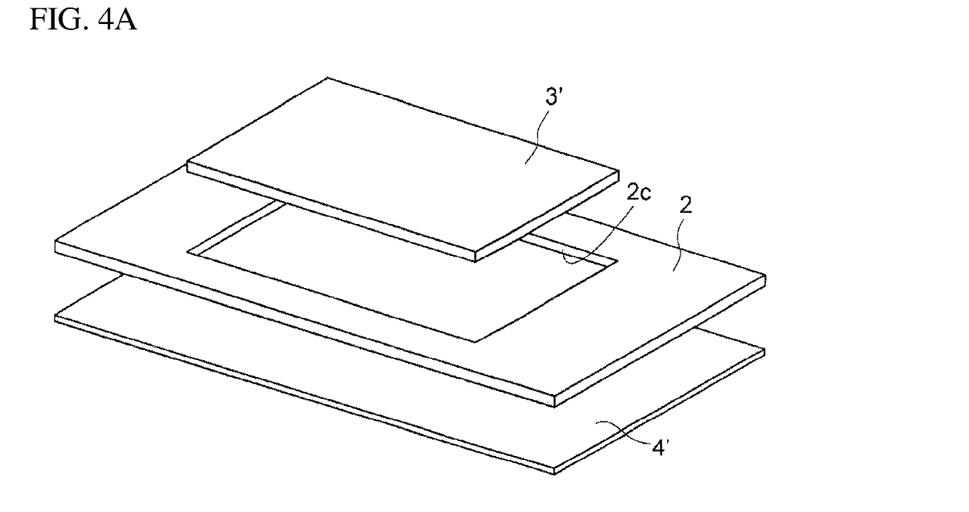
FIGS. 4A and 4B are perspective views illustrating steps for producing the lightweight decorative panel according to the first embodiment of the present invention.

As it is illustrated in FIG. 4A, according to the method for producing the lightweight decorative panel 1, the first opening 2c is initially provided for the porous formed-material 2' (not shown) to form a porous formed-material 2 (first opening step). The first opening 2c can be provided by using of a diamond cutter, a wire cutter, or the like. Herein, the porous formed-material 2' is a porous formed-material 2 in the state of the opening has not been previously provided, and therefore a sheet of a board material as a raw material without any opening. Hereinafter, the component having the number with "apostrophe (')" such as the porous formed-material 2' means, for example, a raw material or the like, which is in unfinished state prior to any processing is conducted.

Subsequently, the porous formed-material 2 and a plate-shape stone material 3' are adhered, and then laminated to the one side of a decorative stone plate 4' to form a laminate (laminating step). Herein, the plate-shape stone material 3 is fitted to the area of the first opening 2c of the porous formed-material 2 and adhered to the inner circumference of the first opening 2c. Herein, the plate-shape stone material 3' is a framing stone material 3 which is in the state of that the opening has not been previously provided, and therefore, which is a sheet of a board without any opening. Similarly, the decorative stone plate 4' is a decorative stone plate 4 which is in the state of that the opening has not been previously provided, and therefore, which is a sheet of a board without any opening. The dimension of the first opening 2c is a dimension in which the plate-shape stone material 3' can be fitted.

Herein, the porous formed-material 2 and the plate-shape stone material 3' are respectively adhered to the decorative stone plate 4'. Therefore, the plate-shape stone material 3' may be simply fitted to the inner circumference of the first opening 2c without adhesion. An adhesive such as a polymer cement type adhesive agent, an epoxy-based adhesive agent, or a caulking agent can be used.

Figure 4B:
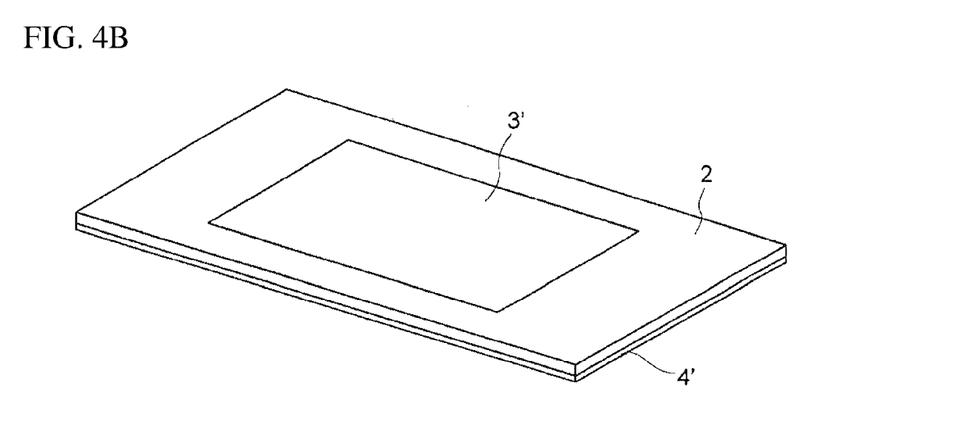

Thus, as shown in FIG. 4B, the laminate comprised of the porous formed-material 2 and the plate-shape stone material 3' and the decorative stone plate 4' is provided.

Subsequently, at the center of the above-described laminate, a perforation is carried out so that a hole passed through both of the plate-shape stone material 3' and the decorative stone plate 4' is formed. The second opening 5 of the framing stone material 3 and the third opening 4a of the decorative stone plate 4 are formed at once (second opening step). Accordingly, the lightweight decorative panel 1 according to the present invention as illustrated in FIG. 1A is finished. Herein, although the perforation is carried out at the center part of the above-described laminate during the second opening step, the position may be offset from the center, depending on the form of the sink, along the longitudinal direction and/or in the width direction to a certain extent. The second opening 5 and the third opening 4a can be provided by using of a tool which is different from that used for providing the first opening 2c.

Furthermore, in the second opening step, any perforation process can be carried out to form an opening to which a hydrant or the like can be provided.

Furthermore, a variation of the method for producing the lightweight decorative panel 1 is described hereinafter.

Figure 5A:
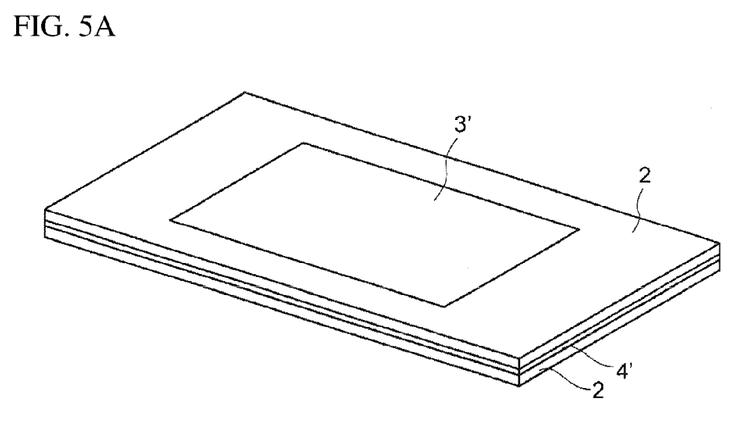
FIGS. 5A and 5B are perspective views illustrating steps for producing the lightweight decorative panel according to a variation of the present invention.

During the above-described laminating step, as shown in FIG. 5A, a set of a single porous formed-material 2 and a single plate-shape stone material 3 is disposed on the both sides of the decorative stone plate 4', respectively.

Figure 5B:
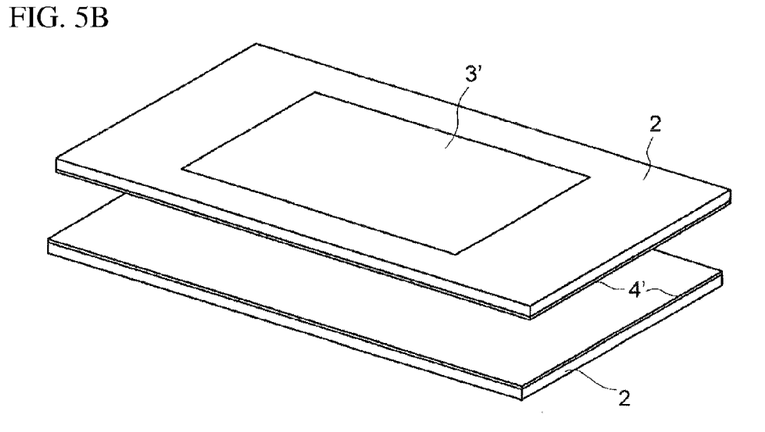

Between the laminating step and the opening step, as shown in FIG. 5B, the decorative stone plate 4' is cut to provide two sheets of the above-described laminates (slicing step). Herein, the slicing step may be carried out after the opening step.

According to this variation, during its transportation and production (but before the slicing step), the decorative stone plate 4' has a thickness larger twice or more than that of the decorative stone plate 4 of the finished product. Therefore, it can prevent occurrence of any disruptive accident on the decorative stone plate 4' during the transportation or production, even if the finished product has a large and thin decorative stone plate 4. Accordingly, the expensive decorative stone plate 4 can be safely thinner, and therefore it is possible to significantly reduce the cost for the material.

According to the lightweight decorative panel 1 of the present invention, the panel can be light-weighted without losing its strength by using of the porous formed-material 2, as a part of the structure, as it is described hereinafter. Therefore, the lightweight decorative panel 1 can be conveyed easily, and therefore the number of the workers for conveying the panel can be reduced, and there is no need to take the heavy machinery or the like into the room. Accordingly, in case of that the lightweight decorative panel 1 of the present invention is used, handling of the panel at the construction site can be facilitated, and therefore workability at the construction site can be improved.

Herein, according to the lightweight decorative panel 1 of the present invention, the first main surface is comprised of the decorative stone plate 4 as a whole, and the peripheral part of the second main surface surrounding the opening is comprised of the framing stone material 3. Therefore, the inner peripheral edge of the opening can be covered with the framing stone material. Accordingly, the panel can be light-weighted without deteriorating its appearance, since the porous formed-material is not exposed on the inner peripheral edge of the opening.

Application of the lightweight decorative panel 1 includes a top-plate member for a kitchen counter having a sink; a wall material having a window; a wall material having a ventilation opening, etc. The lightweight decorative panel 1 can be employed as any decorative panel having an opening.

Figure 6:
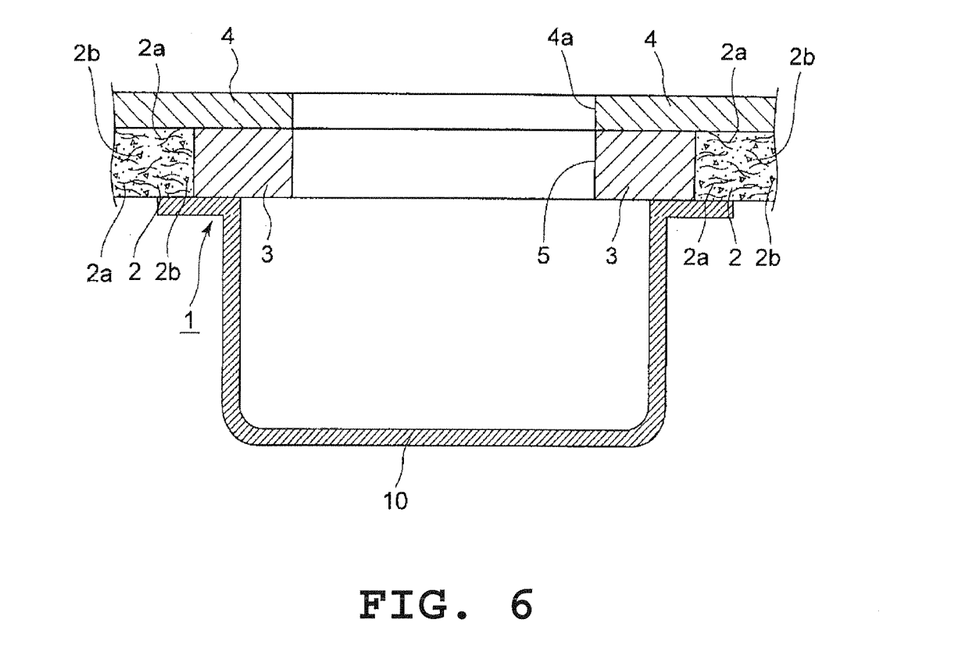
FIG. 6 is a perpendicular cross-sectional view illustrating the lightweight decorative panel of the present invention with a sink for a kitchen being attached thereto.

As shown in FIG. 6, the lightweight decorative panel 1 can be placed so that the decorative stone plate 4 is set upwardly as a top plate, and the third opening 4a and the second opening 5 are set above a sink 10 for a kitchen.

Thus, according to the present invention, the upper surface of the lightweight decorative panel 1 can be decorated with the decorative stone plate 4, the inner peripheral edge of the opening of the lightweight decorative panel 1 can be decorated with the framing stone material 3, and the porous formed-material 2 is used at the unremarkable part(s), and therefore it can be light-weighted. Accordingly, it may has an appearance similar to that of a marble stone panel made of a decorative stone material such as a marble stone, as a whole, or the like, and it can be significantly light-weighted in comparison with such marble stone panel.

For example, the weight of the marble stone panel in a dimension of 1800 (length: mm)×650 (width: mm)×30 (thickness: mm) (having specific gravity: 2.8) is 75.4 kg. The weight of the lightweight decorative panel 1 of the present invention having the same dimension to that of the marble stone panel is 38.9 kg (wherein the specific gravity of the decorative stone plate 4 is 2.8, the specific gravity of the porous formed-material 2 is 0.8, the specific gravity of the framing stone material 3 is 2.8). Therefore, the weight can be approximately a half (½). According to such weight, it can be conveyed by one or two workers. Accordingly, the handling can be facilitated at the construction site, and therefore the workability can be remarkably improved.

In the present invention, the decorative stone plate 4 can be disposed on the two main surfaces of the porous formed-material 2, respectively, and therefore both of these two surfaces can be decorated. Such panel can be developed in other decorative applications than the kitchen counter having a sink. In this case, it is desirable that the thickness of the decorative stone plate 4 is decreased to an extent its strength is not to be insufficient, so that total weight of the lightweight decorative panel 1 is not to be too heavy.

1-2. Porous Formed-Material

The porous formed-material 2 to be used in the lightweight decorative panel 1 is described hereinafter.

Returning to FIG. 1B, the porous formed-material 2 is comprised of a porous lightweight cementitious panel wherein a reinforcing fiber(s) 2a and a bubble(s) 2b are dispersed and contained in a cured-cementitious material. Such porous lightweight cementitious panel can be obtained by, for example, filling a cement, water, a reinforcing fiber(s) 2a, and a kneaded formed product obtained by prefoaming a foaming agent into a form block, and curing them together.

Type of the cement described above includes, but is not particularly limited to, a conventional Portland cement, a high-early-strength Portland cement, a super high-early strength Portland cement, and the like, and other various kinds of cements.

The blending ratio of water to the cement is preferably within a range from 20 to 100 parts by weight of water, and more preferably within a range from 20 to 50 parts by weight of water with respect to 100 parts by weight of the cement. An excessively large volume of water tends to lower the strength, and an excessively short volume of water tends to lower the fluidity of the cement mixture and disturb the formability at the time of forming.

The reinforcing fiber 2a includes a polyvinyl alcohol fiber (Vinylon fiber); a polyolefin-based fiber such as a polypropylene fiber, a polyethylene fiber, and the like; an aramide fiber; a carbon fiber; a steel fiber; a glass fiber, etc.

The fiber length of the reinforcing fiber 2a is not particularly limited, but is preferable within a range from 4 to 35 mm. Because, in case of that the fiber length of the reinforcing fiber 2a is less than 4 mm, the reinforcing effect may tend to be insufficient.

It is advantageous to have longer fiber length for the reinforcing fiber 2a from the viewpoint of the reinforcing effects, but on the other hand, as the fiber length increases, there may be a case in which the dispersibility lowers and the reinforcing fiber 2a in the porous formed-material 2 is unevenly distributed, and the strength of the porous formed-material 2 may be adversely lowered. Herein, there is no particular limitation to the thickness of the reinforcing fiber 2a, but the reinforcing fiber 2a having a thickness within a range from 10 µm to 100 µm can be used.

Herein, during the cement is mixed, if only the reinforcing fiber 2a is evenly dispersed therein, a porous formed-material 2 can be obtained, which has a reinforcing structure wherein the reinforcing fiber 2a is entwined. Therefore, during the production of the porous formed-material 2, any complicated processes such as positioning of the reinforcing fiber 2a to be embedded therein are no needed, and therefore, a porous formed-material 2 having no variation on its strength can be easily produced.

The amount of the reinforcing fiber 2a to be added therein is preferably within a range from 0.5 to 5 parts by weight relative to 100 parts by weight of the cement. When the amount of the reinforcing fiber 2a to be added therein is excessively small, the reinforcing effects are lowered, and the strength of the porous formed-material 2 becomes low as well. On the other hand, with the amount of the reinforcing fiber 2a to be added therein being larger, the reinforcing effects on the porous formed-material 2 are further improved. However, with the amount of the reinforcing fiber 2a to be added therein being excessive, its dispersibility in the cement mixture is to be deteriorated. As a result, the reinforcing fiber 2a may be unevenly distributed, and the porous formed-material 2 may have an uneven strength, and therefore, on the contrary, there may be a possibility of lowering its strength.

From such viewpoints, the amount of the reinforcing fiber 2a to be added therein is more preferably within a range from 0.5 to 3 parts by weight relative to 100 parts by weight of the cement.

Herein, the foaming agent includes, but is not particularly limited to, a foaming agent for a cement or a concrete, for example, a protein-based foaming agent, a surfactant-based foaming agent, a resin-based foaming agent, or the like, and other known various kinds of foaming agents.

The specific gravity of the porous formed-material 2 is preferably within a range from 0.6 to 1.4, more preferably within a range from 0.8 to 1.2 which is similar to that of woody plywood. In case of the specific gravity is smaller, the porous formed-material 2 is to be more light-weighted, and therefore the handling during the carrying and the constructing thereof can be facilitated.

Herein, during the production of the porous formed-material 2, a water reducing agent can be appropriately used. The water reducing agent includes, for example, but is not particularly limited to, a naphthalene-based water reducing agent, a sulfonic acid-based water reducing agent, a poly carbonic acid-based water reducing agent, etc.

During the production of the porous formed-material 2, a conventionally known mixing machine can be used to knead a cement, water, a reinforcing fiber 2a, and a foam obtained by prefoaming of a foaming agent, and other additive(s), and the like. Herein, it is necessary to uniformly knead the entire mixture without damaging the state of the foam obtained by prefoaming of the foaming agent as well as the reinforcing fiber in the mixture.

In the event that the foam obtained from the foaming agent is damaged during the kneading, the size of air bubble in the formed porous formed-material 2 becomes ununiform and variation may be generated in the strength of the porous formed-material 2. Furthermore, when the reinforcing fiber 2a is damaged and broken, the desired reinforcing effects may not be obtained.

2. Second Embodiment

Subsequently, a lightweight decorative panel wherein a reinforcing part is provided to a peripheral surface of a porous lightweight cementitious panel is described. Hereinafter, this porous lightweight cementitious panel is referred to as an end-covered panel.

Figure 7A:
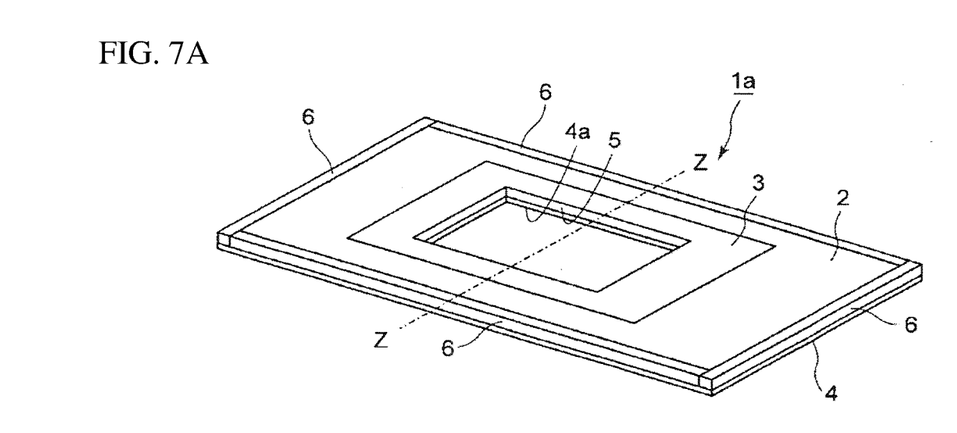
FIG. 7A is a perspective view of the lightweight decorative panel according to the second embodiment of the present invention.
Figure 7B:
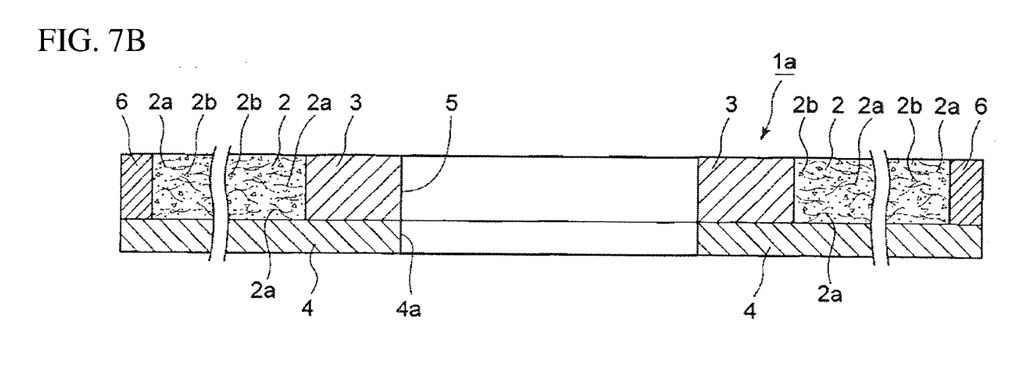
FIG. 7B is a perpendicular cross-sectional view of the lightweight decorative panel illustrated in FIG. 7A at dashed line Z-Z.

FIG. 7A is a perspective view of a lightweight decorative panel 1a according to the second embodiment. FIG. 7B is a perpendicular cross-sectional view of the lightweight decorative panel 1a illustrated in FIG. 7A at dashed line Z-Z. Herein, the same component to that of the first embodiment is shown in the same letter or numeral, and therefore, the description of such component is omitted.

As shown in FIGS. 7A and 7B, a reinforcing part 6 can be adhered and disposed to a peripheral surface of the porous formed-material 2, or adhered and disposed to an upper surface of the decorative stone plate 4. After disposing the reinforcing part 6, the peripheral surface of the reinforcing part 6 and the peripheral surface of the decorative stone plate 4 can be formed in a flush surface by using a diamond cutter or the like. The reinforcing part 6 can be composed of the same stone material to that of the decorative stone plate 4, or the like.

According to the lightweight decorative panel 1*a* of the present invention, the reinforcing part 6 is provided to the peripheral surface of the porous formed-material 2 to form an end-covered panel. Thereby, the peripheral surface of the porous formed-material 2 can be protected. Accordingly, it can prevent the peripheral surface of the porous formed-material 2 from being damaged by receiving an external pressure. Herein, it is expected that use of the decorative stone plate as the reinforcing part 6 can improve the appearance.

Herein, it is described that the reinforcing parts 6 are provided to the all four peripheral surfaces of the porous formed-material 2. But, it is not limited to such embodiment. For example, the reinforcing parts 6 may be provided to the only three peripheral surfaces. Because, in case of a single peripheral surface of the porous formed-material 2 is arranged so that the surface is coming into contact with a wall, it prevents the peripheral surface from receiving an external pressure.

3. Third Embodiment

Figure 8:
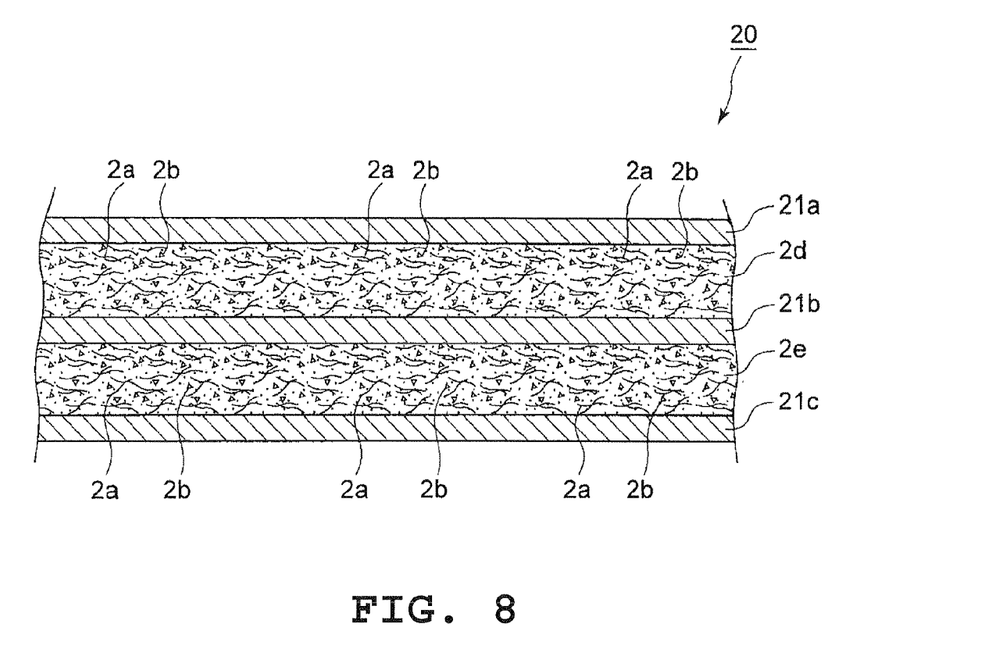
FIG. 8 is a perpendicular cross-sectional view illustrating a structure of a porous lightweight cementitious panel having a high strength according to the third embodiment of the present invention.

FIG. 8 is a perpendicular cross-sectional view illustrating a structure of a porous lightweight cementitious panel having a high strength according to the third embodiment of the present invention. The high-strength porous lightweight cementitious panel 20 illustrated in FIG. 8 can be used as the porous formed-material 2 in the lightweight decorative panel 1 according to the first embodiment as illustrated in FIG. 1B as described above.

As shown in FIG. 8, the high-strength porous lightweight cementitious panel 20 is a laminated panel having a structure comprising 5 layers, wherein a first reinforcing layer 21*a*, a first porous lightweight cementitious panel 2*d*, a second reinforcing layer 21*b*, a second porous lightweight cementitious panel 2*e*, and a third reinforcing layer 21*c* are disposed in this order. The structures of the first and second porous lightweight cementitious panels 2*d*, 2*e* are similar to that of the porous lightweight cementitious panel explained in the above-described first embodiment, respectively. Therefore, the explanation thereof is omitted. Herein, the high-strength porous lightweight cementitious panel 20 is to be a laminated panel having a structure comprising at least 5 layers. It may be a laminated panel having a structure comprising 6 layers or more wherein an additional porous lightweight cementitious panel(s) and/or an additional reinforcing layer(s) is/are disposed.

Each of the first to the third reinforcing layers 21*a*, 21*b* and 21*c* can be comprised of a resin layer comprising a glass mat. Each of the first to the third reinforcing layers 21*a*, 21*b* and 21*c* may have a thickness, for example, within a range from 1.0 to 2.0 mm. Each of the first and the second porous lightweight cementitious panels 2*d* and 2*e* may have a thickness, for example, within a range from 5.5 to 8.5 mm. Accordingly, the high-strength porous lightweight cementitious panel 20 may have a thickness within a range from 15 to 20 mm.

According to such high-strength porous lightweight cementitious panel 20, it has a structure wherein the reinforcing layers are disposed on both sides of each of the porous lightweight cementitious panels, respectively. Therefore, it can provide a higher strength than that of the panel having a single porous lightweight cementitious panel as shown in the lightweight decorative panel 1 according to the first embodiment as illustrated in FIG. 1B. Specifically, even in case of that a wood screw or the like is introduced and attached to the lightweight decorative panel employing the high-strength porous lightweight cementitious panel 20 of this embodiment, the high-strength porous lightweight cementitious panel 20 has a superior wood screw-holding ability, and therefore it can inhibit or prevent the wood screw-attached part from being damaged. Herein, the porous lightweight cementitious panel is light-weighted. Therefore, even in case of that two porous lightweight cementitious panels 2*d* and 2*e* are employed, there is no much difficulty to carry it. Namely, according to the high-strength porous lightweight cementitious panel 20, it can be light-weighted and its strength can be improved further.

4. Fourth Embodiment

Figure 9:
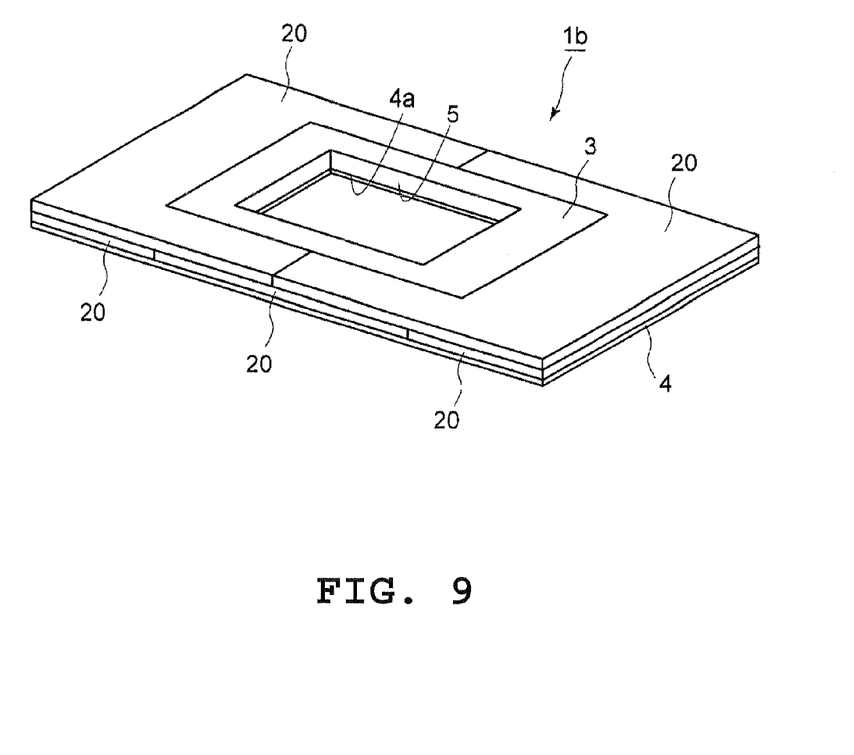
FIG. 9 is a perpendicular cross-sectional view illustrating a lightweight decorative panel according to the fourth embodiment of the present invention.

FIG. 9 is a perpendicular cross-sectional view illustrating a lightweight decorative panel 1*b* according to the fourth embodiment of the present invention. The lightweight decorative panel 1*b* employs a plurality of the high-strength porous lightweight cementitious panels 20. In the fourth embodiment, a case where the entire length of the high-strength porous lightweight cementitious panel 20 is shorter than the entire length (long side) of the lightweight decorative panel is considered. Specifically, the entire length (long side) of the high-strength porous lightweight cementitious panel 20 depends on the dimension of the plant facilities since the panel 20 is mass-produced at the plant. For example, the entire length of the high-strength porous lightweight cementitious panel 20 is up to about 1800 mm. Whereas, a kitchen counter having a sink sometimes have a length more than 1800 mm. Therefore, a case is arisen where a plurality of the high-strength porous lightweight cementitious panels 20 are to be joined together and employed.

In case of a plurality of the high-strength porous lightweight cementitious panels 20 are joined together, strength of the jointed part is decreased. Therefore, in the lightweight decorative panel 1*b*, a structure wherein the high-strength porous lightweight cementitious panels 20 are alternately stacked twice or more as it is shown in FIG. 9 is provided as the porous formed-material 2 of the lightweight decorative panel 1 according to the first embodiment as illustrated in FIG. 1B as described above. Accordingly, such structure can exclude any part having a poor strength.

Herein, in the lightweight decorative panel 1*b*, the porous formed-material 2 described in the first embodiment can be used instead of the high-strength porous lightweight cementitious panel 20. In this case, the similar results are expected as well.

5. Fifth Embodiment

Figure 10:
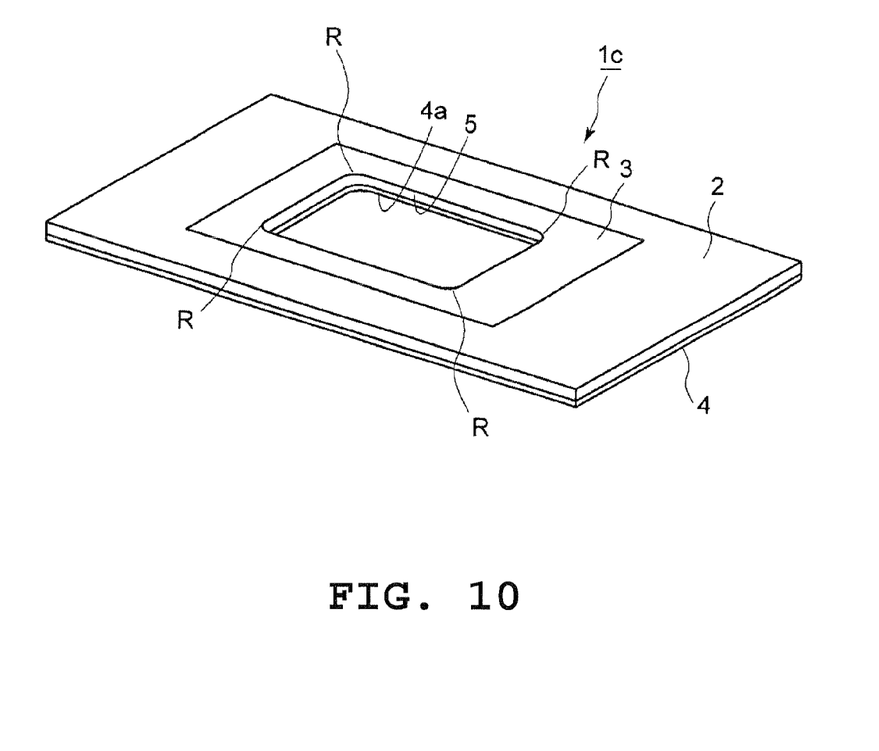
FIG. 10 is a perspective view illustrating a lightweight decorative panel according to the fifth embodiment of the preset invention.

FIG. 10 is a perspective view illustrating a lightweight decorative panel according to the fifth embodiment of the present invention. As shown in FIG. 10, it is preferable that the second opening 5 and the third opening 4*a* in the lightweight decorative panel 1*c* respectively have four corners in round shape R. Thereby, appearance of the lightweight decorative panel 1*c* can be further improved. Superior advantages can be provided as a panel to be used as a kitchen counter having a sink, to which a superior appearance is required. Herein, provision of the four corners described above in round shape R can facilitate its washability and improve sanitary level.

As described above, embodiments for carrying out the present invention are provided. Of course, the present invention is not limited to the above-described embodiments. Certainly, the present invention can be carried out with any additional appropriate modification within a scope applicable to the spirit of the present invention. Those are all encompassed in technical scope of the present invention.

This application claims priority based on the Japanese Patent Application No. 2012-195486 filed on Sep. 5, 2012. The entire disclosure of the specification of the above-identified application is incorporated herein by reference.

INDUSTRIAL APPLICABILITY

The lightweight decorative panel according to the present invention can be used as a kitchen counter having a sink. It may be only used as the kitchen counter having a sink. But, it may be widely available as a floor or a wall in an architectural space, a storage shelf for a kitchen, and the like.

EXPLANATIONS OF LETTERS OR NUMERALS 1, 1a, 1b and 1c: lightweight decorative panel
2: porous formed-material
2d and 2e: porous lightweight cementitious panel
2a: reinforcing fiber
2b: bubble
2c: first opening
3: framing stone material
4: decorative stone plate
4a: third opening
5: second opening
6: reinforcing part
10: sink for a kitchen
20: porous lightweight cementitious panel having a high strength
21a, 21b and 21c: reinforcing layer

The invention claimed is:

1. A lightweight decorative panel having an opening, wherein
   a first main surface is made of a decorative stone plate as a whole;
   a peripheral part of a second main surface surrounding the opening is made of a framing stone material; and
   a part of the second main surface excluding the framing stone material is made of a porous formed-material in a shape of a plate.

2. The lightweight decorative panel according to claim 1, wherein the porous formed-material is comprised of a porous lightweight cementitious panel wherein a bubble(s) and a reinforcing fiber(s) are dispersed in a cured-cementitious material.

3. The lightweight decorative panel according to claim 2, wherein the porous formed-material is comprised of a laminated panel having a structure comprising at least five layers wherein a first reinforcing layer, a first porous lightweight cementitious panel, a second reinforcing layer, a second porous lightweight cementitious panel, and a third reinforcing layer are disposed in this order.

4. The lightweight decorative panel according to claim 3, which has a structure wherein a plurality of the laminated panels are alternately stacked twice or more.

5. The lightweight decorative panel according to claim 1, wherein the decorative stone plate is made of a granite stone or a marble stone.

6. The lightweight decorative panel according to claim 1, which is used in a top-plate member of a kitchen counter having a sink, a wall material having a window, or a wall material having a ventilation opening.

7. The lightweight decorative panel according to claim 1, wherein
   the framing stone material has a second opening generally at its center;
   the porous formed-material has a first opening larger than the second opening;
   an outer peripheral edge of the framing stone material is fitted to an inner peripheral edge of the first opening of the porous formed-material, so that the edges are closely related to each other, and the framing stone material and the porous formed-material are conjugated together;
   the decorative stone plate has a third opening to communicate with the second opening, and is disposed on the conjugate of the porous formed-material and the framing stone material.

8. A method for producing a lightweight decorative panel having an opening, which is characterized in that the method comprises:
   a laminating step for disposing a porous formed-material having a first opening larger than the opening and being in a shape of a plate, and a plate-shape stone material having a dimension to be fitted to an inner periphery of the first opening, on one side of a decorative stone plate, to form a laminate; and
   after the laminating step, an opening step for providing an opening passing through a part of the plate-shape stone material of the laminate.

9. The method for producing the lightweight decorative panel according to claim 8, wherein a set of the single porous formed-material and the single plate-shape stone material is disposed on the both sides of the decorative stone plate, respectively, during the laminating step; and the method comprises a slicing step for cutting the decorative stone plate between the laminating step and the opening step, or after the opening step.

* * * * *